(12) United States Patent
Massoptier-David et al.

(10) Patent No.: US 9,796,149 B2
(45) Date of Patent: Oct. 24, 2017

(54) MOLD WITH SECTORS FOR A TIRE INCLUDING INSULATING SUPPORTING PLATES, AND ASSOCIATED MOLDING METHOD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Michaël Massoptier-David, Clermont-Ferrand (FR); Thomas Simonelli, Clermont-Ferrand (FR); Gilles Walrand, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 15/103,473

(22) PCT Filed: Dec. 9, 2014

(86) PCT No.: PCT/EP2014/077015
§ 371 (c)(1),
(2) Date: Jun. 10, 2016

(87) PCT Pub. No.: WO2015/086580
PCT Pub. Date: Jun. 18, 2015

(65) Prior Publication Data
US 2016/0375644 A1    Dec. 29, 2016

(30) Foreign Application Priority Data

Dec. 10, 2013   (FR) .................................. 13 62344

(51) Int. Cl.
*B29D 30/06*        (2006.01)
(52) U.S. Cl.
CPC ...... *B29D 30/0662* (2013.01); *B29D 30/0629* (2013.01); *B29D 2030/0674* (2013.01); *B29D 2030/0677* (2013.01)
(58) Field of Classification Search
CPC ............ B29D 30/0629; B29D 30/0662; B29D 2030/0674; B29D 2030/0677
(Continued)

(56) References Cited

U.S. PATENT DOCUMENTS 3,609,819 A    10/1971 Searle
3,797,979 A    3/1974 Greenwood
(Continued)

FOREIGN PATENT DOCUMENTS

DE    1808811       7/1969
EP    0578105 A1    1/1994
(Continued)

*Primary Examiner* — James Mackey
(74) *Attorney, Agent, or Firm* — Dickinson Wright PLLC

(57) ABSTRACT

A mold for a tire comprises first and second shells that are intended to mold lateral sidewalk of the tire, a plurality of sectors that are distributed in the circumferential direction and are intended to mold a tread of said tire, a first and a second support plate that each comprise a bearing face with which the associated shell is mounted axially in contact, and a plurality of first and second heating means for heating at least the first and the second shell, respectively.

14 Claims, 1 Drawing Sheet

SINGLE FIGURE

(58) Field of Classification Search
USPC .......................................................... 425/41
See application file for complete search history.

(56) References Cited

U.S. PATENT DOCUMENTS

| | | | |
|---|---|---|---|
| 4,116,595 A * | 9/1978 | Fike | B29D 30/54 |
| | | | 425/17 |
| 4,568,259 A | 2/1986 | Mattson | |
| 8,597,008 B1 | 12/2013 | Rex et al. | |
| 8,662,871 B2 * | 3/2014 | Takagi | B29C 33/04 |
| | | | 425/36 |
| 2013/0284336 A1 | 10/2013 | Kaneda | |

FOREIGN PATENT DOCUMENTS

| | | |
|---|---|---|
| EP | 0701894 A2 | 3/1996 |
| EP | 2040911 | 1/2008 |
| EP | 2000290 A1 | 12/2008 |
| EP | 2072235 A1 | 6/2009 |
| JP | 2013-160203 A | 8/2013 |
| WO | 2008-009724 A1 | 1/2008 |
| WO | 2011/136097 A1 | 11/2011 |

* cited by examiner

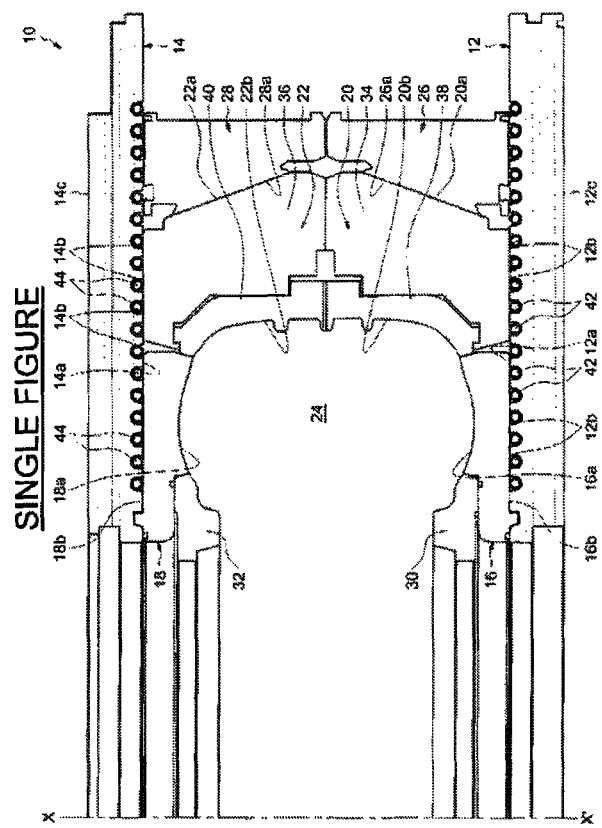

MOLD WITH SECTORS FOR A TIRE INCLUDING INSULATING SUPPORTING PLATES, AND ASSOCIATED MOLDING METHOD

CROSS-REFERENCE TO RELATED APPLICATION

This application is a 371 national phase entry of PCT/EP2014/077015 filed 9 Dec. 2014 which claims the benefit of French Patent Application No 1162344 filed 10 Dec. 2013, the contents of which are incorporated herein by reference for all purposes.

BACKGROUND

The present disclosure relates to the field of molds for curing or vulcanizing vehicle tire, and more particularly molds of the sectored type.

This type of mold mainly comprises two shells that each mold one of the lateral sidewalls of the tire, a plurality of sectors that mold the tread of said tire and are radially movable between an open position and a closed position of the mold, and at least one clamping ring for allowing the sectors to move radially.

The shells and the sectors define an inner space that is intended to be brought into contact with the unvulcanized green form of tire. For more details concerning such a type of sectored mold, reference may be made for example to the documents DE 1 808 811, U.S. Pat. No. 3,797,979, EP-A2-0 701 894 and EP-B1-2 040 911.

The manufacturing of the tire, and more particularly the vulcanization phase, requires that a pressure is applied to the green tire in order to press it against the internal faces of the mold and that heat is supplied to the mold. For example, it is known practice to heat the mold by means of a heat-transfer fluid such as pressurized water vapour, as is described in the Patent Application EP-A1-2 072 235.

It is also known practice to heat the mold electrically or else by magnetic induction, as is illustrated in the document JP-A-2012-25126. In that document, first heating means are mounted on the shells radially on the inner side of the mold and second heating means are mounted both on the shells and on the sectors.

The heat is thus produced directly in the mold, thereby making it possible to obtain satisfactory energy efficiency. Moreover, such mounting of the magnetic induction heating means promotes the obtaining of a uniform temperature in the mold.

However, in order to optimize the curing of the tire, it is necessary to heat the two shells of the mold to and keep them at a temperature different from that to which the sectors are heated. Moreover, it may also be necessary, for each of the shells, for separate regions to be heated to and kept at different temperatures.

SUMMARY

The present disclosure aims to meet these requirements.

More particularly, the present disclosure aims to provide a sectored mold that has good energy efficiency and makes it possible to be able to stably heat the shells and the sectors to and keep them at different temperature levels during the curing phase of the tire.

The present disclosure aims to provide a sectored mold that makes it possible to be able to heat separate regions of each shell to and keep them at different temperatures.

In one embodiment, the mold is intended for a tire of the type comprising a tread and two lateral sidewalk. The mold comprises first and second shells that are intended to mold the lateral sidewalk of the tire, a plurality of sectors that are distributed in the circumferential direction and are intended to mold the tread of said tire, and a first and a second support plate that each comprise a bearing face with which the associated shell is mounted axially in contact.

The mold also comprises a plurality of first heating means for heating at least the first shell and a plurality of second heating means for heating at least the second shell. Each support plate comprises at least one body that is made of a thermally insulating material and delimits the bearing face of said plate. At least one recess is formed in said bearing face, the first or second associated heating means being accommodated in said recess.

Providing the body of each support plate in a thermally insulating material combined with the mounting of the associated heating means inside at least one recess provided in the bearing face of said body makes it possible to obtain a mold with satisfactory energy efficiency. Moreover, it is possible to keep the shells and the sectors at different temperatures. The production of each plate from a thermally insulating material makes it possible to limit heat exchanges within the plates and to be able to maintain a non-uniform temperature distribution inside the mold. This makes it possible to be able to optimize the curing of the tire.

In a preferred embodiment, a plurality of spaced-apart recesses are formed in the bearing face of each support plate, one of the first or second heating means being accommodated inside each of said recesses. Advantageously, each heating means is able to generate heat independently of the activation of the other heating means. Preferably, the recess(es) in each support plate are oriented axially towards the inside of said mold. The recess(es) in each support plate can also be made in the form of annular and concentric grooves.

In one embodiment, the first and second heating means each comprise at least one first group of heating means disposed axially facing the associated shell. The first and second heating means can each comprise at least one second group of heating means disposed axially facing the sectors.

Preferably, the sectors are mounted axially in contact with the bearing faces of the support plates in the closed position of said mold.

The mold can also comprise at least one clamping ring that cooperates with outer faces of the sectors.

Advantageously, the body of each support plate is made of a thermally insulating material that has a thermal conductivity lower than that of the materials of the sectors and of the shells. The body of each support plate can be made of a non-metal material, notably of a composite material.

In one embodiment, the body of each support plate has an axial thickness of between 35 mm and 60 mm.

Preferably, the first and second heating means are electric.

The disclosure also relates to a method for molding a tire with the aid of a mold as defined above, wherein the operation of the first and second heating means is controlled such that they heat the two shells to a temperature different from that to which the sectors of the mold are heated.

BRIEF DESCRIPTION OF THE DRAWING

FIG. 1 illustrates an example of a mold according to an exemplary embodiment disclosed herein.

DETAILED DESCRIPTION

The present disclosure will be understood better from reading the detailed description of an embodiment considered by way of entirely non-limiting example and illustrated by the appended FIGURE, which is a half view in cross section of a sectored mold for a tire according to one exemplary embodiment of the disclosure in a closed position of said mold.

FIG. 1 shows an exemplary embodiment of a sectored mold, bearing the overall reference 10, provided for the curing or vulcanization of an annular tire that comprises a cylindrical tread extended by first and second opposite lateral sidewalls. The tire is for a motor vehicle which can be for example a passenger car, a utility vehicle or a vehicle of the heavy goods type. In the FIGURE the mold 10 is illustrated in a position assumed to be vertical. The mold 10 has an axis X-X' of symmetry which is coincident with the axis of revolution of the tire.

The mold 10 comprises lower and upper plates 12, 14, a lower and an upper annular shell 16, 18 mounted so as to bear against the plates, axially facing the latter, and a ring of lower sectors 20 and upper sectors 22 that are disposed axially between the plates 12, 14 and radially surround the shells 16, 18. The shells 16, 18 and the sectors 20, 22 are centred on the axis X-X'. The sectors 20, 22 are distributed circumferentially around said axis. The lower sectors 20 bear axially against the upper sectors 22. The sectors 20 are identical to one another and symmetrical with respect to the sectors 22, with respect to a radial median plane of the mold 10.

The sectors 20, 22 are radially movable jointly between a moved-together position with respect to the shells 16, 18, as illustrated in the FIGURE, corresponding to a closed position of the mold 10, and a spaced-apart, open position of said mold. In the closed position, the shells 16, 18 and the plurality of sectors 20, 22 jointly delimit an impression 24 of the tire. The closed position of the mold 10 corresponds to the molding position of the tire.

The mold 10 also comprises a lower clamping ring 26 that is secured to the lower plate 12 and comprises an inner face 26a with a frustoconical shape that bears radially against a complementary outer face 20a of each lower sector 20. The mold 10 also comprises an upper clamping ring 28 that is secured to the upper plate 14 and comprises an inner face 28a with a frustoconical shape that bears radially against a complementary outer face 22a of each upper sector 20. The clamping rings 26, 28 axially face one another and leave a slight axial clearance between one another. In a manner known per se, each sector 20, 22 is connected to the associated clamping ring 26, 28 by way of a slide (not shown) such that an axial movement of said ring causes the radial movement of the associated sectors 20, 22 between the closed position and the open position of the mold, or vice versa.

Each shell 16, 18 comprises an internal annular face 16a, 18a for molding the lateral sidewalk of the tire. The internal face 16a axially faces the opposite internal face 18a. The internal faces 16a, 18a are mutually symmetrical with respect to the radial median plane of the mold 10. A radial external face 16b, 18b of each shell is mounted so as to bear axially against a radial internal face 12a, 14a of the associated plate 12, 14. The external face 16b, 18b of each shell is axially on the opposite side from the internal face 16a, 18a. Each plate 12, 14 forms a support plate for the associated shell 16, 18. Each shell 16, 18 is fastened to the associated support plate 12, 14. Each plate 12, 14 is situated axially on the opposite side from the impression 24 delimited by the shells 16, 18 and the sectors 20, 22.

Each sector 20, 22 also comprises an inner face 20b, 22b, radially on the opposite side from the frustoconical outer face 20a, 22a, in order to mold the tread of the tire. In the description, the terms "internal" and "external" are used to define an orientation of the faces in the radial direction, while the terms "inner" and "outer" are used to define an orientation of the faces in the axial direction.

The mold 10 also comprises a lower and an upper annular bead ring 30, 32 that are mounted so as to bear against the shells 16, 18 in order to mold the lateral beads of the tire. In the exemplary embodiment illustrated, the bead rings are attached parts that are fastened to the shells 16, 18. Alternatively, the bead rings 30, 32 can be produced in one piece with said shells.

In the exemplary embodiment illustrated, each sector 20, 22 comprises a support 34, 36 that delimits the outer face 20a, 22a in contact with the clamping ring 26, 28, and a mold fitting 38, 40 that is fastened to the support and delimits the inner face 20b, 22b bearing the impression of the tread of the tire. The mold fitting 38, 40 is situated radially on the inner side of the associated support 34, 36. The support 34, 36 can be made of a metal material, notably of steel, and the mold fitting 38, 40 of aluminium. The shells 16, 18 and the bead rings 30, 32 can be made of a metal material, notably of steel.

In the closed position of the mold 10, the lower sectors 20 and upper sectors 22, respectively, are radially in contact with the shell 16 and the shell 18, respectively. The shells 16, 18 and the sectors 20, 22 are in contact in the radial direction by way of the mold fittings 38, 40. The inner face 20b, 22b of each sector 20, 22 locally extends the internal face 16a, 18a of the associated shell.

The mold 10 also comprises a plurality of lower and upper heating means 42, 44 that are mounted respectively on the lower and upper support plates 12, 14. Each heating means 42, 44 is electric and advantageously produced in the form of an electrical heating resistor. Each electrical heating means 42, 44 is able to generate heat independently of the operation of the other heating means. The heating means 42, 44 are identical to one another.

In order to allow the mounting of the heating means 42 and 44, each plate 12, 14 comprises a plurality of grooves 12b, 14b that are formed on the internal face 12a, 14a which forms a bearing face with which the associated shell 16, 18 is mounted axially in direct contact. In the closed position of the mold 10, the external faces of the sectors 20, 22 are in axial contact with the internal face 12a, 14a of the associated plate. In this closed position, an axial clearance exists between each clamping ring 26, 28 and the internal face 12a, 14a of the axially facing plate.

The grooves 12b, 14b in each plate extend axially in the direction of a radial external face 12c, 14c of said plate which is axially on the opposite side from the internal face 12a, 14a and is intended to bear axially against the associated vulcanizing press (not shown). The grooves 12b, 14b extend axially towards the outside through the thickness of the plate 12, 14 starting from the internal face 12a, 14a. The bottom of each groove 12b, 14b is axially offset towards the outside with respect to the internal face 12a, 14a of the plate. Each groove 12b, 14b is open and oriented axially towards the inside of the mold, i.e. axially on the side of the shells 16, 18, the sectors 20, 22 and the clamping rings 26, 28. Each groove 12b, 14b that forms a recess opens out onto the internal face 12a, 14a. In the exemplary embodiment illustrated, the grooves 12b, 14b are annular and concentric, of axis X-X'.

The grooves 12b, 14b in a plate are identical to one another and disposed on the internal face 12a, 14a of said plate with a regular radial spacing. The grooves 12b in the lower plate are symmetrical with respect to the grooves 14b in the upper plate, with regard to the radial median plane of the mold 10. In the exemplary embodiment illustrated, the grooves 12b, 14b have a cross section with a U-shaped profile. Alternatively, the grooves could have some other profile, for example a stepped profile, or a square or rectangular profile.

In the exemplary embodiment illustrated, the grooves 12b, 14b form three groups on each plate. For each support plate 12, 14, the grooves of the first group radially surround the shell 16, 18, the grooves of the second group radially surround the sectors 20, 22, and the grooves of the third group radially surround the clamping ring 26, 28. The groups of grooves 12b, 14b in each plate are disposed radially at the periphery of the shell 16, 18, of the sectors 20, 22 and the clamping ring 26, 28, respectively. The first, second and third groups of grooves 12b, 14b in each plate axially face the external faces of the shell 16, 18, of the sectors 20, 22 and of the ring 26, 28, respectively.

Each lower heating means 42 is accommodated inside one of the grooves 12b in the lower plate. The heating means 42 are offset axially towards the outside with respect to the shell 16, to the sectors 20 and to the clamping ring 26. The heating means 42 are situated axially between the external faces of the shell 16, of the sectors 20 and of the ring 26, and the bottom of the grooves 12b.

In a similar manner, each upper heating means 44 is housed inside one of the grooves 14b in the upper plate and is offset axially towards the outside with respect to the shell 18, to the sectors 22 and to the clamping ring 28. The heating means 44 are situated axially between the external faces of the shell 18, of the sectors 22 and of the ring 28, and the bottom of the grooves 14b.

For each support plate 12, 14, the associated heating means 42, 44 are distributed among three groups. The heating means 42, 44 of the first group are mounted inside the first group of grooves 12b, 14b and axially face the shell 16, 18. The heating means 42, 44 of the second group and of the third group, respectively, are mounted inside the second group and third group, respectively, of grooves 12b, 14b and axially face the sectors 20, 22 and the clamping ring 26, 28, respectively. The heating means 42, 44 are oriented axially towards the inside in the direction of the shell 16, 18, or of the sectors 20, 22 or of the clamping ring 26, 28. No means is interposed axially between these elements of the mold 10 and the heating means 42, 44.

As indicated above, in the closed position of the mold 10, the internal face 12a, 14a of each plate comes axially into contact with the shell 16, 18 and with the sectors 20, 22. In the exemplary embodiment illustrated, the heating means 42, 44 are axially flush with the internal face 12a, 14a of the associated plate. Thus, the heating means 42, 44 carried by the plates 12, 14 are also axially in contact with the shells 16, 18 and the sectors 20, 22.

Such contacts between the heating means 42, 44 and the shells 16, 18 and sectors 20, 22 promote heat transfer by conduction inside the mold 10. Alternatively, the heating means 42, 44 can be slightly spaced apart axially with respect to the shells and/or sectors. In this case, the heat transfer takes place mainly by radiation.

As indicated above, the heating means 42, 44 of the third group of each support plate 12, 14 axially face the clamping ring 26, 28. These heating means 42, 44 are not used for heating the clamping rings 26, 28. Specific heating means (not shown) of the mold 10 are disposed to this end axially between the plates 12, 14 and radially around the outer faces of said rings. Alternatively, each clamping ring 26, 28 can have a circular cavity in which a heat transfer fluid flows. The third group of each of the heating means 42, 44 is provided to obtain adaptability of the plates 12, 14 of the mold 10 to tire models with greater diameters and so as to be able to heat the shells and the sectors associated with such tires. The same plates 12, 14 can thus be used for heating shells and sectors having different dimensions. This is particularly useful when the plates 12, 14 remain mounted on the vulcanizing press. In the exemplary embodiment illustrated, only the first and second groups of heating means 42, 44 associated with the shells 16, 18 and with the sectors 20, 22 are active.

The plates 12, 14 fulfil a double supporting function, namely that of supporting the shells 16, 18 and of supporting the heating means 42, 44. Each plate 12, 14 is made of a thermally insulating material that has a thermal conductivity lower than the thermal conductivity of the material of the shells 16 and 18, lower than the thermal conductivity of each of the materials of the sectors 20 and 22, and lower than the thermal conductivity of the material of the rings 26, 28. Advantageously, each plate 12, 14 is made of a non-metal material, notably a composite material which can for example be based on cement and inorganic fibres. Alternatively, other types of thermally insulating materials can be provided. Each plate 12, 14 can have an axial thickness of between 35 mm and 60 mm.

The production of each plate 12, 14 from a thermally insulating material and the mounting of the heating means 42, 44 inside the grooves 12b, 14b make it possible to obtain good energy efficiency of the mold 10. Specifically, the production of each plate 12, 14 from a thermally insulating material promotes diffusion of the heat generated in the direction of the shells 16, 18 and sectors 20, 22. Moreover, the heat is produced in the immediate vicinity of the external faces of these elements of the mold 10. Furthermore, the disposition of the heating means 42, 44 on the support plates 12, 14 of the shells promotes axial compactness of the mold 10.

The mold 10 also comprises a control unit (not shown) that is able to control the operation of the heating means 42, 44. The control unit makes it possible to control each heating means 42, 44 independently of the operation of the other heating means such that one region of the mold can be heated to a temperature different from that to which another separate and adjacent region is heated.

For example, during curing, the two shells 16, 18 of the mold can be heated by the heating means 42, 44 of the first groups to a temperature different from that to which the sectors 20, 22 are heated by the heating means 42, 44 of the second groups. Each thermally insulating plate 12, 14 makes it possible to limit heat exchanges inside said plate such that it is possible to keep the thermal difference provided between the shells 16, 18 and the sectors 20, 22 substantially constant. In this way, the curing of the tire is optimized. It is also possible to control, for each of the shells 16 and 18, differential heating between a region of said shell and another separate region. Such thermal differentiation can also be controlled for the sectors 20, 22.

In the exemplary embodiment illustrated, each support plate 12, 14 is made entirely of a thermally insulating material. Each plate 12, 14 consists of a body made of thermally insulating material. In a variant embodiment, it may be conceivable to produce each support plate from several parts, said support plate being provided for example with a body that is made of thermally insulating material and comprises the grooves formed on the internal contact face, inside which groups the heating means are accommodated, and with a separate part that may for example be metal, axially covers the body on the opposite side from the grooves and is provided to come axially into contact with the vulcanizing press.

In the exemplary embodiment illustrated, each support plate comprises a plurality of grooves that form recesses and are each associated with a heating means. Alternatively, it may be possible to mount two heating means inside one single groove. In another alternative, it may also be possible to provide a single recess formed on the internal bearing face of each plate, to mount the heating means 42 or 44 inside said recess, and to provide thermally insulating partitions between two adjacent heating means. Such a solution is more complex to implement, however.

In the exemplary embodiment described, the heating means are produced in the form of electrical heating resistors. Alternatively, it is possible to provide other types of heating means, for example metal tubes through which a heat transfer fluid passes, notably water or pressurized steam at a temperature greater than 150° C., coming from a heat transfer fluid circuit that comprises means for controlling the circulation of fluid inside each tube independently.

The present disclosure has been illustrated on the basis of a mold comprising a set of lower sectors and a set of upper sectors for molding the tread of the tire. It is also possible, without departing from the scope of the disclosure, to provide a mold comprising a single set of sectors for molding this part of the tire. In this case, a single clamping ring is provided for the mold.

The invention claimed is:

1. A mold for a tire including a tread and two lateral sidewalls, the mold comprising:
   first and second shells mold-able to the lateral sidewalls of the tire,
   a plurality of sectors that are distributed in the circumferential direction and are mold-able to the tread of said tire,
   a first and a second support plate that each comprise a bearing face with which the associated shell is mounted axially in contact, a plurality of first heating and second heating means for heating at least the first and the second shell, respectively,
   wherein each support plate comprises at least one body that is made of a thermally insulating material and delimits the bearing face of said plate, at least one recess being formed in said bearing face, the first or second heating means being accommodated in said recess.

2. The mold according to claim 1, wherein a plurality of spaced-apart recesses are formed in the bearing face of each support plate, one of the first or second heating means being accommodated inside each of said recesses.

3. The mold according to claim 1, wherein each heating means is able to generate heat independently of the activation of the other heating means.

4. The mold according to claim 1, wherein the recesses in each support plate are oriented axially towards the inside of said mold.

5. The mold according to claim 1, wherein the recesses in each support plate are made in the form of annular and concentric grooves.

6. The mold according to claim 1, wherein the first and second heating means each comprise at least one first group of heating means disposed axially facing the associated shell.

7. The mold according to claim 6, wherein the first and second heating means (42, 44) each comprise at least one second group of heating means disposed axially facing the sectors.

8. The mold according to claim 1, wherein the sectors are mounted axially in contact with the bearing faces of the support plates in a closed position of said mold.

9. The mold according to claim 1, comprising at least one clamping ring that cooperates with outer faces of the sectors.

10. The mold according to claim 1, wherein the body of each support plate is made of a thermally insulating material that has a thermal conductivity lower than that of the materials of the sectors and of the shells.

11. The mold according to claim 1, wherein the body of each support plate is made of a non-metal material, notably of a composite material.

12. The mold according to claim 1, wherein the body of each support plate has an axial thickness of between 35 mm and 60 mm.

13. The mold according to claim 1, wherein the first and second heating means are electric.

14. A method for molding a tire with the aid of a mold according to claim 1, wherein the operation of the first and second heating means is controlled such that they heat the two shells to a temperature different from that to which the sectors of the mold are heated.

* * * * *